Figure 1:
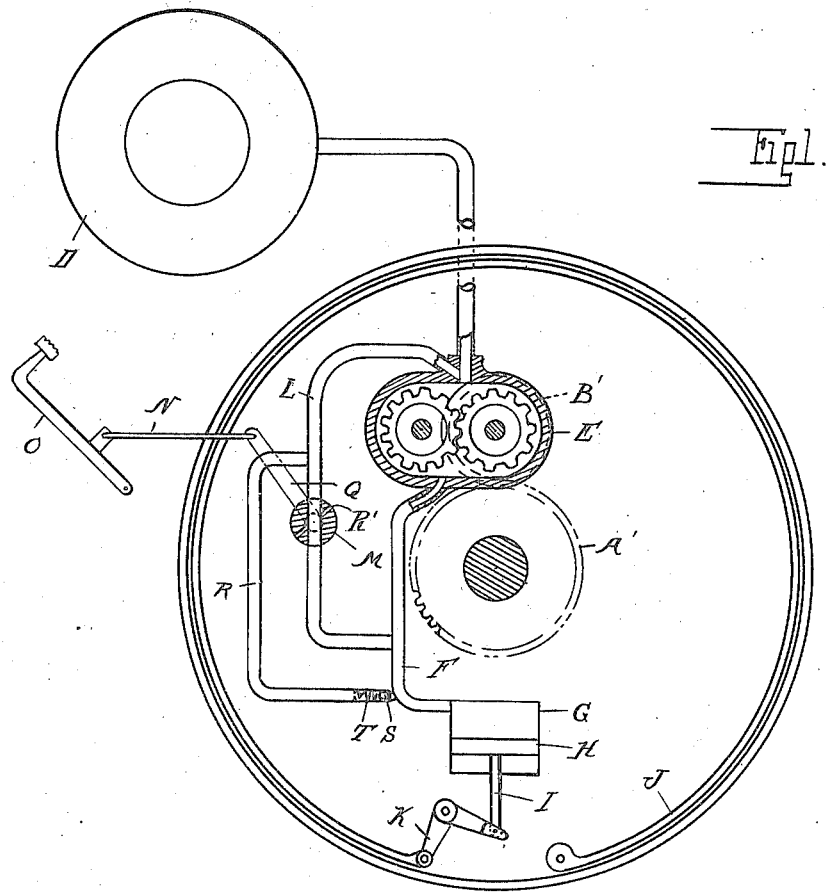

A. SCHMIDT.
VEHICLE BRAKE.
APPLICATION FILED SEPT. 14, 1914.

1,207,801.

Patented Dec. 12, 1916.
2 SHEETS—SHEET 1.

WITNESSES:

INVENTOR
Albert Schmidt

BY
ATTORNEYS

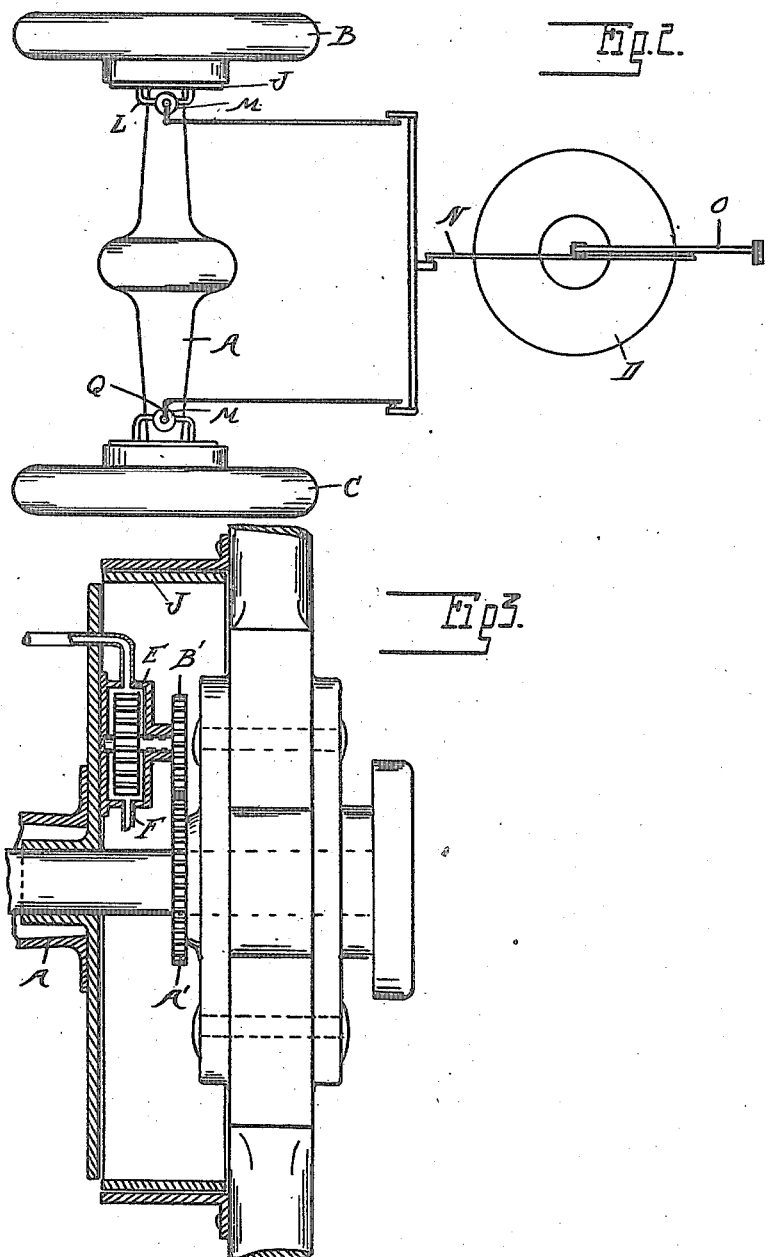

UNITED STATES PATENT OFFICE.

ALBERT SCHMIDT, OF FLINT, MICHIGAN, ASSIGNOR OF ONE-HALF TO ALBERT J. CHAMPION, OF FLINT, MICHIGAN.

VEHICLE-BRAKE.

1,207,801.  Specification of Letters Patent.  Patented Dec. 12, 1916.

Application filed September 14, 1914. Serial No. 861,597.

*To all whom it may concern:*

Be it known that I, ALBERT SCHMIDT, a citizen of the Republic of France, residing at Flint, in the county of Genesee and State of Michigan, have invented certain new and useful Improvements in Vehicle-Brakes, of which the following is a specification, reference being had therein to the accompanying drawings.

The invention relates to vehicle brakes and has among the objects thereof to provide a construction of vehicle brake which effectually prevents skidding of the wheels while permitting variable braking pressure up to the limit where the wheel loses traction; to provide a construction of brake in which the braking pressure upon one wheel is independent of the braking pressure upon another wheel; to provide a structure in which the braking pressure applied to a plurality of wheels is automatically varied through the medium of the wheels and in which the braking pressure applied to one wheel is independent of the action of the other wheel; and further, to provide a construction in which the wear upon the brake members of one wheel will not prevent a proper setting of the brakes of the other wheel or wheels.

Other objects of the invention will more fully hereinafter appear.

The invention resides in the peculiar construction, arrangement and combination of parts as hereinafter set forth and particularly pointed out in the claims.

In the drawings,—Figure 1 is a diagram of a structure embodying the invention; Fig. 2 illustrates certain details of construction; and Fig. 3 is a sectional view through the brake-drum.

In the operation of brakes upon moving vehicles, there is always danger of applying too great a braking force or an uneven braking force. This results in the skidding of the wheels to which the brake is applied. Inasmuch as the friction between the wheel and the ground is much greater when the wheel is rolling than when it is skidding, the braking effect is correspondingly diminished. Furthermore when the wheels begin to skid all control over the movement of the car is lost. With my improved construction the braking force applied to one wheel is independent of the braking force applied to the other wheel, and means is provided for properly regulating the braking force of each wheel. In the preferred form of the invention the braking force applied to any one wheel is regulated through the medium of the wheel itself.

While my invention may be embodied in various specific constructions, I have shown in the drawings one embodiment of the invention.

A designates the rear axle of the motor vehicle and B C the rear wheels. As the braking mechanism of the wheels B and C is the same, I will give a detail description of but one of the wheels. Thus D is a tank or reservoir containing a suitable fluid such as oil, and E is a pump, herein shown as of the rotary gear type, though any suitable type of pump may be employed. The pump E draws oil from the reservoir D and forces it into a conduit F connected with a cylinder G containing a piston H. The piston H is provided with a rod I that is attached to the brake-band J of the wheel B through the medium of suitable lever mechanism K.

L is a by-pass conduit around the pump E, and M is a valve in the by-pass for variably restricting or closing the same. This valve is connected in any suitable manner to a control for the operator, the connection being herein shown as comprising a rod N and a brake-actuating lever or pedal O. The pump E is driven from the wheel A as by means of a gear A' on the hub of the wheel that meshes with a pinion B' of the pump, or in any other suitable manner. The pump parts and drive mechanisms therefor are preferably housed within the brake drum, as shown in Fig. 3. Leading from the valve M of the brake mechanism of the wheel C is a rod Q that is also attached to the pedal lever N.

Referring to the mechanism described in connection with the wheel A, during the rotation of this wheel the pump will be driven and will force the liquid from the reservoir D into the conduit F. If the valve M is open the liquid will be returned to the reservoir D through the medium of the by-pass L. If the pedal lever has been depressed to apply the brakes, the valve M will be closed, which will cause the oil to be forced into the cylinder G, thereby moving the piston H outwardly and applying the brake. This pressure will continue as long as the wheel is rotated, but when the wheel stops the pump ceases to force oil into the cylinder G. The pressure is then automatically relieved either by leakage through the pump or if desired, by providing the valve M with an opening R' which always permits a slight flow through the by-pass. Upon application of the brake to the wheel, as the rotation of the wheel is retarded, the operation of the pump is correspondingly retarded. After the valve and by-pass have been closed, if the wheel ceases to rotate and then—because of the release of the brake due to the non-rotating of the wheel—the wheel again starts to rotate, the braking action will be automatically restored.

Upon the depression of the pedal lever the operation is, of course, the same in connection with both wheels, but as will be readily understood, the braking action applied to one wheel is not in any way affected by the braking action applied to the other wheel but is controlled solely through the medium of each wheel. Such an arrangement gives the driver the best control over his machine and he is permitted to apply the full force of the brakes without danger of skidding, since the condition of the wheels to which the braking action is applied will properly control the braking force.

When the vehicle is being driven at a high rate of speed and the brakes are suddenly applied, the high rotation of the pump would cause an excessive pressure to be transmitted to the piston H, which might tend to injure the system. In order to prevent an excessive pressure, means is provided for relieving the pressure in the system when it exceeds a predetermined point. In the particular structure illustrated the conduit R has one end attached to the by-pass L beyond the valve M, and has the other end connected to the conduit F. Arranged in the conduit R is a check-valve S normally held closed by a spring T. When the pressure in the system exceeds that of the spring T the valve S will open. Thus by regulating the tension of the valve spring T the pressure which may accumulate in the system can be limited.

The arrangement embodying the invention not only has the advantages just recited, but also is highly desirable since if one brake-band or drum becomes worn the wear will be taken care of by movement of the piston attached to the brake levers. Also the wear of the brake mechanism of one wheel will not in any way affect the brake mechanism of the other wheel.

While I have shown and described the invention as applied in the usual manner to the rear wheels, it is of course, readily apparent that my improvement may be embodied in a brake mechanism applied to any number of wheels.

What I claim as my invention is:—

1. The combination with a revoluble wheel, of a brake drum thereon, a brake-band for said drum, a hydraulic pump inclosed within said brake drum, mechanism for driving said pump from said wheel, a motor operated by the pressure developed by said pump, and a connection between said motor and said brake-band, for the purpose described.

2. The combination with a revoluble wheel, of a brake drum thereon, a brake-band for said drum, and a means within said brake drum for operating said brake-band, said means being dependent upon the rotation of said wheel.

3. The combination with a revoluble traction wheel, of a non-skidding brake therefor actuated by the rotation of said wheel at any rate of speed and inoperative when said wheel is not rotating.

4. The combination with a revoluble wheel, of a brake therefor, a hydraulic pump, mechanism for driving said pump from said wheel, means operated by the pressure developed by said pump for actuating said brake and a by-pass for permitting a drop in the pressure when said wheel is not rotated.

In testimony whereof I affix my signature in presence of two witnesses.

ALBERT SCHMIDT.

Witnesses:
A. H. LEDBETER,
BENJ. MEHARD.